Patented Apr. 30, 1946

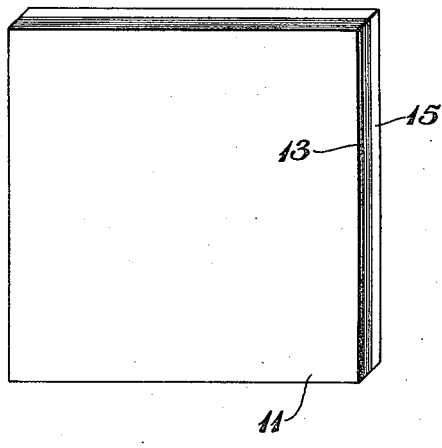
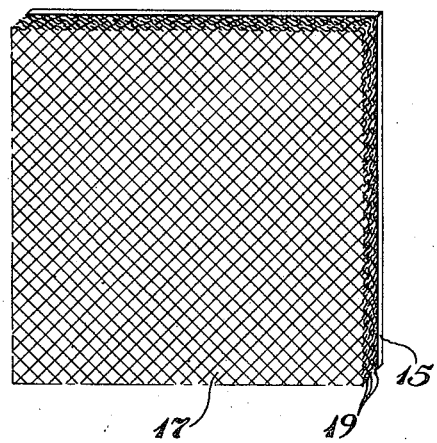
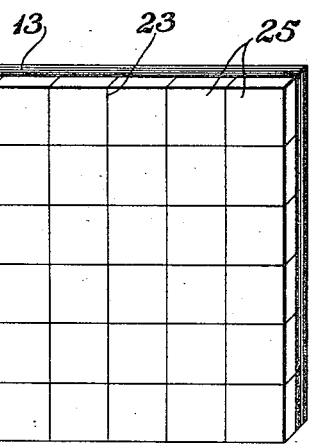
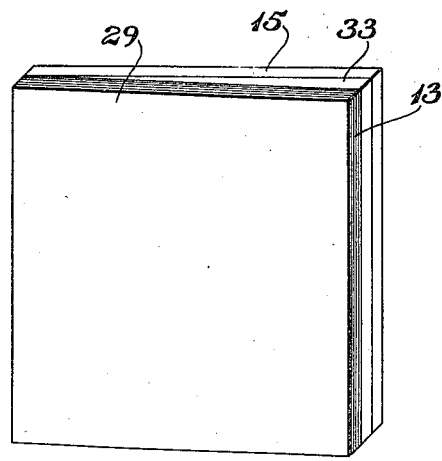
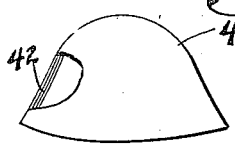

2,399,184

UNITED STATES PATENT OFFICE 2,399,184

LAMINATED ARMOR PLATE STRUCTURE

Winfield Walter Heckert, Wilmington, Del., assignor to E. I. du Pont de Nemours & Company, Wilmington, Del., a corporation of Delaware Application September 27, 1941, Serial No. 412,580

3 Claims. (Cl. 154—52.5)

This invention relates to laminated armor plate structures, and more particularly, it relates to armor plate structures comprising laminae composed of a synthetic linear superpolymer.

The term "synthetic linear superpolymers" is limited and restricted to the new fiber-forming synthetic linear polymeric materials described in Carothers U. S. patents, Nos. 2,071,250, 2,071,253 and 2,130,948. Of the synthetic linear superpolymers described in the above-said patents, the superpolyamides disclosed in the last two of the above-mentioned patents are the most useful; and, for the purpose of simplicity and convenience, the invention, although not limited thereto, will be described with particular reference to nylon; i. e., synthetic linear superpolyamides such as disclosed, for example, in said patents, Nos. 2,071,253 and 2,130,948.

The synthetic linear superpolymers of the present invention are high molecular weight products which are capable of being formed into filaments or films which can be cold-drawn in the case of filaments, and cold-drawn or cold-rolled in the case of films, to obtain fibers or films showing, by characteristic X-ray patterns, molecular orientation along the lines of the draw; i. e., along the fiber axis of the filaments or along the direction of the draw in the plane of the films. By the term "oriented synthetic linear superpolymers," as used throughout the specification and claims, is meant cold-drawn filaments, or cold-drawn or cold-rolled films, showing the above-said molecular orientation.

It has been suggested, heretofore, to use oriented synthetic linear superpolymers in the form of sheets as interlayers in the production of safety glass. For that purpose, however, only polymer layers up to 0.05 inch thickness have been used. In safety glass containing interlayers of such thickness, shattering of the glass laminae is effectively prevented but penetration of the safety glass by a bullet is not prevented.

Heretofore, steel plates have generally been considered outstanding as armor plate material. For some purposes steel armor plate has two decided disadvantages. In the first place, steel armor plate has considerable weight when used in sufficient thicknesses to afford adequate protection. In the second place, high velocity bullets will do severe secondary damage when they strike a steel armor plate at an angle of approximately 90°. The secondary damage may, in fact, be more severe than the primary damage caused by the impact of the bullet. When a bullet strikes armor plate at a 90° angle, or at angles slightly greater or slightly less, it disintegrates into countless particles. These particles fly in a concentrated pattern substantially normal to the flight of the bullet, and frequently have been known to cut off the wing of an aeroplane. The urgent necessity for armoring aeroplanes has presented a crying need for a lightweight armor plate.

It is, therefore, an object of this invention to provide a lightweight armor plate, particularly suitable for use in aeroplanes, capable of stopping bullets and shell fragments, and capable of diminishing secondary damage resulting from bullet splattering.

It is a further object of the present invention to provide a lightweight armor plate comprising steel combined with laminae which will diminish secondary damage resulting from bullet splattering.

Other objects of the invention will appear hereinafter.

The objects of the invention may be accomplished, in general, by the provision of a laminated armor plate structure comprising laminae composed of an oriented synthetic linear superpolymer. The laminae composed of an oriented synthetic linear superpolymer may, if desired, be laminated to a steel plate.

The present invention will be more clearly apparent by reference to the following description when taken in connection with the accompanying illustrations, in which:

Figure 1 is a perspective view showing one form of armor plate constructed in accordance with the present invention.

Figure 2 is a perspective view showing a modified form of armor plate structure.

Figure 3 is a perspective view showing a segmented armor plate structure.

Figure 4 is a perspective view showing an armor plate structure in which the superpolymer laminae are positioned at an angle to the steel backing plate.

Figure 5 is a side elevational view, with part broken away, of a protective helmet constructed of superpolymer laminae.

Referring to the drawing, reference numeral 11 designates an armor plate structure comprising a plurality of laminae 13 composed of sheets of an oriented synthetic linear superpolymer laminated to a steel armor plate 15. The sheets of oriented synthetic linear superpolymer are bonded to each other and to the steel armor plate by means of an adhesive.

Referring to Figure 2 of the drawing, the armor plate structure 17 comprises a steel armor plate 15, and bonded thereto a plurality of synthetic linear superpolymer fabric webs 19 which are firmly bonded to each other.

In Figure 3 of the drawing is shown an armor plate structure 23 comprising relatively small segments 25 of steel. These steel segments of armor plate may be from 1 to 6 inches square and will prevent extensive primary damage upon impact by a bullet. The segmented steel is backed by a plurality of laminae 13 comprising sheets of an oriented synthetic linear superpolymer.

In Figure 4 of the drawing is shown a modified form of armor plate 29 in which the steel armor plate 15 is connected at an oblique angle to a plurality of laminae 13 comprising sheets of an oriented synthetic linear superpolymer. The superpolymer laminae is connected to the steel armor plate in any desirable manner, for example, by interposing a wedge-shaped wooden member 33. In this form of armor plate, the bullet if it strikes the superpolymer laminae at a 90° angle will necessarily strike the steel armor plate at a sufficiently smaller angle than 90° to prevent penetration thereof.

The protective helmet 40 shown in Figure 5 of the drawing comprises a plurality of superpolymer laminae 42 securely bonded to each other. The laminae are arranged with the lines of orientation of each lamina positioned at right angles to adjacent laminae.

Preferably, the plurality of laminae of synthetic linear superpolymer sheets or fabrics is united by means of a suitable adhesive. It is also preferred that the laminae be bonded to the metal armor plate by means of a suitable adhesive. Particularly desirable results are accomplished by the steps of coating the several laminae of superpolymer with a solution of an adhesive, air drying the coated laminae, and uniting the same by application of pressure and heat. If the armor plate is to comprise steel armor plate, the superpolymer laminae are also preferably bonded to the steel in the same manner, although the metal armor plate may be united to the superpolymer laminae by means of rivets or other mechanical means. Numerous adhesives are suitable for the purpose of bonding the superpolymer laminae to each other and to steel armor plate. For example, the following adhesives are suitable for this purpose:

1. 88% phenol in water
2. 51% phenol in a 50%–50% water-alcohol solution
3. 10% polyhexamethylene adipamide dissolved in phenol
4. 10% beta-diethylaminoethyl methacrylate polymer dissolved in acetone
5. 10% polyhexamethylene adipamide dissolved in a 50%–50% mixture of chloroform and methyl alcohol
6. 10% of a mixture of the interpolymer of hexamethylene diammonium adipate and caprolactam (60%) and amyl benzene sulfonamide (40%) dissolved in a 50%–50% solution of ethyl alcohol and water.

The above-named adhesives are merely illustrative. Many other known adhesives may also be used for this purpose. Polyhexamethyl adipamide-polydecamethylene sebacamide interpolymers having good adhesion to metals.

Phenol-aldehyde resins with or without nylon solutions constitute a preferred class of adhesives. Of these, diphenylol propane-formaldehyde resin is preferred and it is preferably applied from a 10% solution in methanol. When using this particular adhesive, it is preferred that the bond be made by exerting on the members to be adhered to each other a pressure of about 250 pounds per square inch and a temperature between about 100° C. and 175° C. Other phenol-aldehyde resins which are useful as adhesives are tertiary-butyl phenol-formaldehyde resins, diamyl phenol-formaldehyde resins, phenol-furfuraldehyde resins, and phenol-acetaldehyde resins.

The superpolymer laminae should be highly oriented either by cold-drawing or cold-rolling. Preferably, this will be carried out by cold-drawing the film of which the laminae are to be constructed to at least 200% of the original undrawn length of the film or by cold-rolling the film until the surface area (product of length by width) is at least 200% of that of the original unrolled film. The superpolymer laminae furthermore should have a total thickness of at least 0.1 inch in order to function properly as armor plate. Preferably, the total thickness of the laminated superpolymer structure should be at least 0.2 inch for armor plate to be used on aeroplanes. The thickness of the laminated superpolymer structure will, of course, vary for different purposes of use. For helmets and other personal armor, the thickness may be slightly in excess of 0.1 inch but thicknesses less than 0.1 inch are ineffective in stopping bomb fragments or flying particles.

The preferred method of bonding the laminated superpolymer to steel armor plate comprises the application to the steel of a priming coat of a synthetic linear superpolymer, particularly a synthetic linear interpolymer, then baking the primed steel structure, then applying thereto a coating of diphenylolpropane formaldehyde resin dissolved in methanol, then air drying the structure, and finally pressing a laminated synthetic linear superpolymer structure against the coated steel. Pressure and heat may be applied as in the lamination of the superpolymer sheets or fabrics to each other. The preferred priming coat comprises an interpolymer obtained by interpolymerizing hexamethylene diamine, adipic acid, sebacic acid, and caprolactam. The priming coat may comprise a mixture of this interpolymer with diphenylolpropane formaldehyde resin. The preferred mixture comprises 60% of the interpolymer and 40% of the resin. The baking of the primed steel plate is preferably carried out at 215° C. for a period of about fifteen minutes.

The impact strength of the superpolyamide structures used in the production of the laminated structures of the present invention can be markedly improved by subjecting the superpolyamide structure to the action of a non-solvent swelling agent therefor at a temperature of from 35° C. to 150° C. for a period of at least one minute. As examples of swelling agents suitable for use for this purpose may be mentioned hot water, hot steam, aqueous phenol solutions, and alcohol. For example, when the laminated superpolyamide structure is to be composed of laminae of superpolyamide fabric, an oriented superpolyamide yarn may be skeined and placed in a relaxed condition in a 4% aqueous solution of phenol for five minutes. The superpolyamide yarn is then thoroughly washed in boiling water for one hour to remove as much of the phenol as possible and is then dried in an oven at 65° C. for twenty-four hours. Although the preferred treatment is with aqueous phenol having a concentration of between 3% and 9% at a temperature between 75° C. and 80° C., other concentrations which are below that which will appreciably dissolve nylon are also useful. Furthermore, some of the substituted phenols such as o-cresol or polyhydric phenols such as resorcinol have also been found to be useful. When using substituted phenols or polyhydric phenols, the optimum conditions of concentration, time and temperature of treatment will vary from those above specified when using phenol. The behavior of these substances in improving the impact strength of the polyamide structures appears to depend upon such factors as solubility and distribution coefficient. Likewise, the optimum concentration of phenol for conditioning may be different when using a different superpolyamide. Superpolyamides having satisfactory impact strengths have been obtained by treatments ranging from one to fifteen minutes or longer in aqueous phenol having an initial concentration of 7% and at temperatures of about 25° C. to about 100° C.

Preferably laminae for use in accordance with the present invention should have an impact strength of at least 3000 inch-pounds per inch of length per square inch of cross-section. The impact strength of a monofil or yarn is conveniently determined with the aid of the Olsen pendulum-type impact tester. In the test, upon which the impact strengths given in the specification and claims are based, the sample is held across a gap between clamps, conveniently a three-inch gap, under a tension of about two pounds per thousand denier. The pendulum is dropped from a fixed height and the energy required to break the sample is read directly in inch-pounds. The impact strength per inch of length of monofil or yarn between the clamps, per square inch of cross-section of monofil or yarn is then conveniently calculated. Similarly, a film approximately one inch wide may be clamped in the tester and its impact strength may be measured in terms of inch-pounds per inch of length (between the clamps) per square inch of cross-section.

The following detailed examples illustrate the preferred methods of producing armor plate and the like in accordance with the present invention. It is to be understood, of course, that the invention is not limited to the details set forth in these examples.

*Example I*

Sheets were prepared by casting from melt the interpolymer obtained by interpolymerizing hexamethylene diamine, adipic acid, and sebacic acid in such proportions that the final interpolymer comprised 70% of the ingredients of polyhexamethylene adipamide and 30% of polyhexamethylene sebacamide. The sheets were cold-rolled in several steps to develop maximum strength, the first rolling reducing the thickness from 26 mils to 16 mils, the second reducing it to 12 mils and the third reducing it to 8 mils. The rolling was in only one direction, producing orientation only in that direction. The oriented sheets were thoroughly cleansed with carbon tetrachloride, then coated with a methanol solution of diphenylolpropane formaldehyde resin, air dried, and united so that alternate sheets would have their direction of orientation lying approximately at right angles. This crosswise uniting of the sheets produced a laminated product with maximum two directional strength. The sheets were then pressed together at a pressure of 250 pounds per square inch and a temperature of 100° C. for one hour. The product was 0.42 inch thick. It stopped bullets fired normal to the plane of the laminae from a .22 caliber rifle, using .22 short ammunition at a range of 20 feet.

*Example II*

A laminated structure such as described in Example I 0.5 inch thick is united to a conventional steel armor plate used for aeroplane fuselages in the following manner. The steel is given a priming coat of an interpolymer obtained by interpolymerizing hexamethylene diamine, adipic acid, sebacic acid, and caprolactam in such proportions that the final interpolymer contains 40% of polyhexamethylene adipamide, 30% of polyhexamethylene sebacamide and 30% of polymerized caprolactam. The priming coat is baked at 215° C. for fifteen minutes. A secondary coating of diphenylolpropane formaldehyde resin is then applied from a methanol solution and air dried. The laminated polymer sheets are then laid upon the coated steel and subjected to 250 pounds per square inch pressure at 100° C. for one hour. The product is installed as part of the armor for the fuselage of an aeroplane, with the polymer layer outermost. When subjected to gunfire, the bullets penetrate the polymer coating and splatter against the steel armor plate but the fragments do a negligible amount of secondary damage to the plane because of the presence of the polymer coating. In this test, .30 caliber armor piercing bullets are used.

*Example III*

A 15 mil diameter melt-spun cold-drawn polyhexamethylene adipamide monofil is conditioned in a relaxed state in a 4% aqueous phenol solution at 75° to 80° C. for five minutes, then washed in boiling water for one hour and dried in an oven at 65° C. for twenty-four hours. The monofil has an impact strength of about 10 inch-pounds per 1000 denier. The monofil is woven to produce a tightly woven basket-weave type of fabric. Twenty pieces of this fabric are coated with a methanol solution of diphenylolpropane formaldehyde resin, air dried and united by pressing them together at 250 pounds per square inch pressure and a temperature of 100° C. for one hour. The laminated product is effective in stopping bullets, shrapnel and shell fragments.

Although this invention has been described with particular reference to superpolyamides, it is applicable broadly to the synthetic linear superpolymers disclosed in the above-mentioned patents. As examples of such polymers, the above-said patents mention the polyesters, polyamides, polyacetals, polyethers, polyanhydrides and polyester-polyamides.

The foregoing examples are not to be considered as limitative but as illustrative of the products of this invention and methods for their preparation. Thus, other types of synthetic linear superpolyamides can be employed. A valuable class of superpolyamides for the preparation of laminated articles are those derived from one or more diamines of formula NH$_2$CH$_2$RCH$_2$NH$_2$ and one or more dicarboxylic acids of formula

HOOCCH$_2$R'CH$_2$COOH or amide-forming derivatives thereof in which R and R' are divalent hydrocarbon radicals free from olefinic and acetylenic unsaturation and in which R has a chain length of at least two carbon atoms. An especially valuable group of superpolyamides within this broad class are those in which R is (CH$_2$)$_x$ and R' is (CH$_2$)$_y$ wherein $x$ is at least two and $y$ is an integer. As examples of superpolyamides which fall within one or both of these groups might be mentioned polyhexamethylene adipamide, polyhexamethylene sebacamide, polydecamethylene sebacamide, polydecamethylene adipamide, as well as copolymers derived from reactants of the types represented in these polyamides. Superpolyamides derived from polymerizable monoaminomonocarboxylic acids or amide-forming derivatives thereof are also useful in the formation of laminated articles. As examples of polyamides of this type might be mentioned those derived from 6-aminocaproic acid, 9-aminononanoic acid, and 11-aminoundecanoic acid, as well as interpolymers derived from a mixture of polymerizable monoaminomonocarboxylic acids. Interpolymers derived from amino acids, diamines, and dibasic acids may also be employed. Mixtures of pre-formed polyamides are also suitable.

Although laminated articles have been described above in which the laminae consist solely of superpolyamides, the presence of other materials in the polymer, such as plasticizers, pigments, resins, dyes or certain cellulose derivatives is not precluded. It is also within the scope of the invention to unite two or more of these laminated structures to interlayers or outerlayers of other fiber-forming or film-forming materials, such as a cellulosic material, for example, regenerated cellulose film, or a resin, for example, vinyl resins, polyvinyl alcohol-aldehyde condensation products, urea formaldehyde resins, polymers of acrylic or methacrylic acid derivatives, etc. Two or more of these laminated products may be separated by cloth, paper, wood, metal sheets or plates, metal wires or wire fabrics, or even by air. The laminated products may be made partly of fabric and partly of film. The fabric may be made of multifilament yarn or monofils. It may be woven or knitted. In certain instances and for certain purposes where flexibility of a part of the structure is desired, the cementing of the laminae may be limited to one or more of the outer edges or to certain portions of the structure. For example, shell fragment-resisting personal armor can be made by leaving portions free from adhesive where bending is required, as at the knee or elbow.

The laminated products of this invention may or may not be transparent depending on whether transparent sheets are used as laminae. For certain purposes, it is, of course, desirable that the armor plate be transparent.

This invention provides a simple method for the preparation of laminated articles of great utility.

Since superpolyamide sheets are exceedingly strong, laminated articles prepared from such polyamide sheets are characterized by great strength, toughness and durability and resistance to rapidly applied forces. This great strength of polyamides, coupled with their low density (approximately 1.1), makes it possible to use lighter armor plates than are possible with armor steel. No plastic or other synthetic material is known to have stopping power at all comparable with the products of this invention. This lightness makes possible the use of these products for many purposes. Among these uses may be mentioned armor plate for automobiles, armor plate window panes for many types of structures, such as aeroplanes, tanks, trucks, and motorcycles; personal protective armor such as helmets, leggings, bulletproof chest protectors, and the like. It was very surprising that this material would be useful for the purposes mentioned above in view of the fact that plates of unoriented polyamide many times the thickness of the above-described products of this invention were shattered in much the same manner as glass when bullets were fired into them. It is, therefore, apparent that a great forward stride has been made in the preparation of protective articles.

As many apparently widely different embodiments of this invention may be made without departing from the spirit and scope thereof, it is to be understood that it is not to be limited to the specific embodiments thereof except as defined in the appended claims.

I claim:

1. A laminated armor plate structure comprising oriented laminae composed of a synthetic linear superpolymer, said laminae firmly bonded to each other by means of diphenylol propane-formaldehyde resin.

2. A laminated armor plate structure comprising oriented laminae composed of a synthetic linear superpolymer, said laminae arranged with the lines of orientation of adjacent laminae at angles to each other, said laminae firmly bonded to each other by means of diphenylol propane-formaldehyde resin.

3. A laminated armor plate structure, comprising a steel plate bonded to oriented laminae composed of a synthetic linear superpolymer, said superpolymer laminae bonded firmly to each other by means of diphenylol propane-formaldehyde resin, and said steel plate bonded to said superpolymer by means of an adhesive composition comprising a synthetic linear superpolymer.

WINFIELD WALTER HECKERT.